United States Patent
Ribeiro et al.

(10) Patent No.: US 12,264,990 B2
(45) Date of Patent: Apr. 1, 2025

(54) METHOD AND A SYSTEM FOR MONITORING THE STATE OF AN EXCHANGER IN AN AIR CIRCUIT OF AN AIRCRAFT

(71) Applicant: LIEBHERR-AEROSPACE TOULOUSE SAS, Toulouse (FR)

(72) Inventors: José Ribeiro, Toulouse (FR); Didier Dubaele, Toulouse (FR); Alexis Castelein, Toulouse (FR); Nicolas Canouet, Toulouse (FR); Fanny Morel, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 601 days.

(21) Appl. No.: 17/597,096

(22) PCT Filed: Jun. 26, 2020

(86) PCT No.: PCT/FR2020/051117
§ 371 (c)(1),
(2) Date: Dec. 27, 2021

(87) PCT Pub. No.: WO2020/260838
PCT Pub. Date: Dec. 30, 2020

(65) Prior Publication Data
US 2022/0268657 A1    Aug. 25, 2022

(30) Foreign Application Priority Data

Jun. 27, 2019 (FR) ...................................... 1907020

(51) Int. Cl.
*G01M 3/00* (2006.01)
*B64D 13/06* (2006.01)
(Continued)

(52) U.S. Cl.
CPC ............ *G01M 3/002* (2013.01); *B64D 13/08* (2013.01); *B64F 5/60* (2017.01); *B64D 2013/0611* (2013.01); *B64D 2013/0618* (2013.01)

(58) Field of Classification Search
CPC ...... F28F 1/003; F28F 2265/16; B64D 13/06; B64D 13/08; B64D 5/60; B64F 2013/0618
See application file for complete search history.

(56) References Cited

U.S. PATENT DOCUMENTS 5,299,763 A * 4/1994 Bescoby ................ B64D 13/06
454/70
6,058,725 A * 5/2000 Monfraix ............... B64D 13/02
165/235

(Continued)

FOREIGN PATENT DOCUMENTS

FR   2978123 A1   1/2013
FR   2996257 A1   4/2014
(Continued)

OTHER PUBLICATIONS

International Search Report issued in Patent Application No. PCT/FR2020/051117, dated Sep. 18, 2020.
(Continued)

Primary Examiner — Jianying C Atkisson
Assistant Examiner — For K Ling
(74) *Attorney, Agent, or Firm* — McDonald Hopkins LLC

(57) ABSTRACT

A method and a system are provided for monitoring the state of a heat exchanger (17) in an air circuit (5) of an aircraft (7), the heat exchanger being intended to cool the air extracted from a source of a main hot air source of the aircraft. An acquisition module (11) is configured to acquire temperature measurements taken by a probe disposed at an outlet of said heat exchanger, the acquisition being carried out when the
(Continued)

Figure 1:
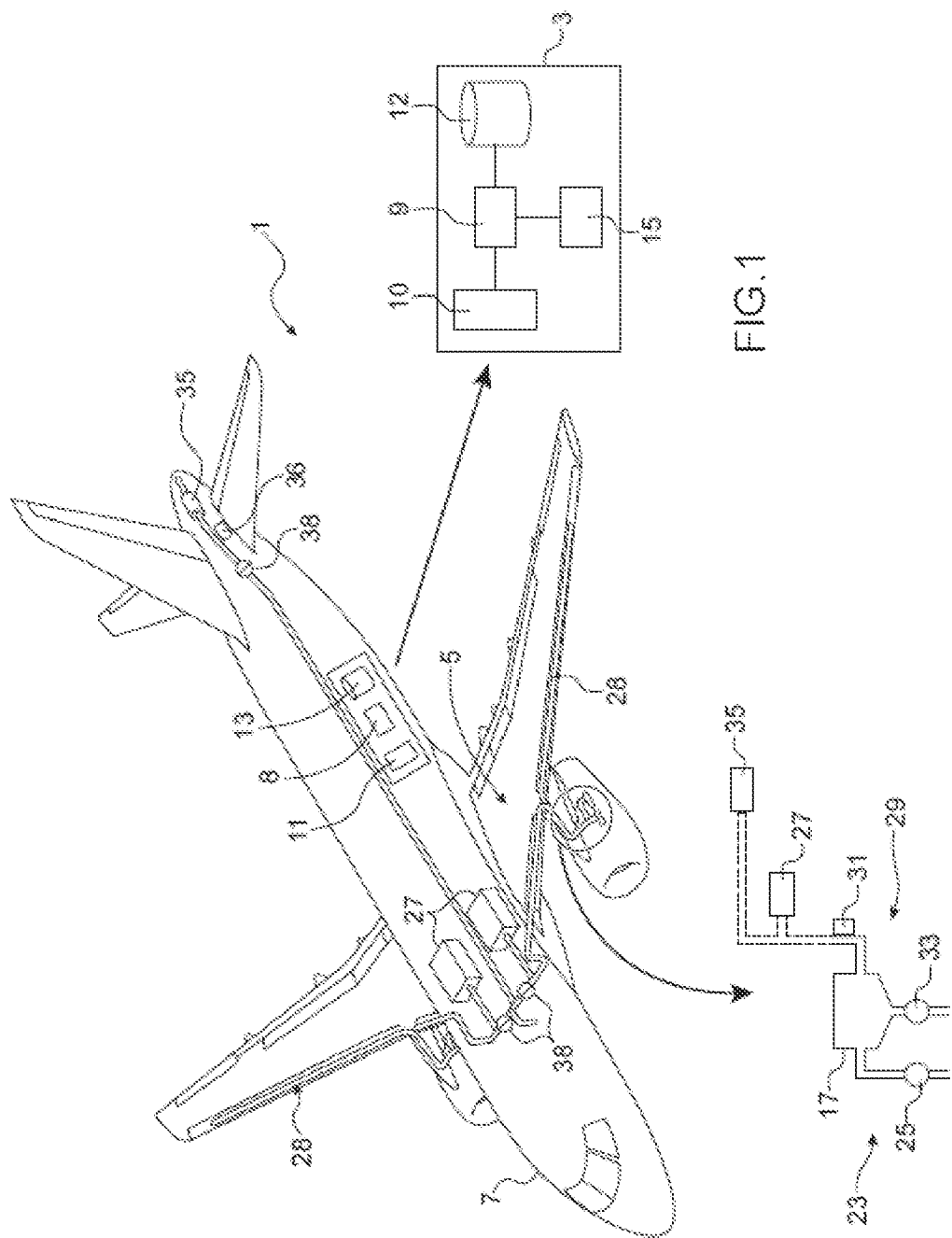

air circuit is supplied by a secondary hot air source downstream of the heat exchanger and the main hot air source being turned off. A processor (9) is configured to select a relevant temperature measurement from the temperature measurements and to detect a possible leak in the heat exchanger (17) by comparing the relevant temperature measurement to a predetermined alert threshold.

13 Claims, 3 Drawing Sheets

(51) Int. Cl.
    *B64D 13/08*     (2006.01)
    *B64F 5/60*     (2017.01)

(56) References Cited

U.S. PATENT DOCUMENTS

| | | | |
|---|---|---|---|
| 6,948,325 B1* | 9/2005 | Axe | B64D 13/06 62/402 |
| 7,155,961 B2* | 1/2007 | Fernandes | F16L 59/18 73/49.1 |
| 2010/0147399 A1* | 6/2010 | Buhring | B64D 13/06 137/468 |
| 2013/0283816 A1* | 10/2013 | Smith | B64D 27/10 60/784 |
| 2014/0309846 A1* | 10/2014 | Howard | B64F 5/60 701/31.9 |
| 2021/0001990 A1* | 1/2021 | Garcia Zuazo | F02C 6/08 |

FOREIGN PATENT DOCUMENTS

| | | |
|---|---|---|
| FR | 3004422 A1 | 10/2014 |
| FR | 3038055 A1 | 12/2016 |

OTHER PUBLICATIONS

French Search Report issued in French Patent Application No. 1907020, dated Mar. 19, 2020.

\* cited by examiner

METHOD AND A SYSTEM FOR MONITORING THE STATE OF AN EXCHANGER IN AN AIR CIRCUIT OF AN AIRCRAFT

This is the National Stage of PCT international application PCT/FR2020/051117, filed on Jun. 26, 2020 entitled "METHOD AND A SYSTEM FOR MONITORING THE STATE OF AN EXCHANGER IN AN AIR CIRCUIT OF AN AIRCRAFT", which claims the priority of French Patent Application No. 1907020 filed Jun. 27, 2019, both of which are incorporated herein by reference in their entirety.

TECHNICAL FIELD

The present invention relates to a method and a system for monitoring the state of a heat exchanger in an air circuit of an aircraft and more particularly, the state and the leak level of the air/air heat exchanger of the circuit.

STATE OF THE PRIOR ART

The air circuit in an aircraft comprises a heat exchanger intended to cool the air extracted from an aircraft engine by an air bleed system. More particularly, the bleed system is connected to the engine compressor via a PRV (Pressure Regulating Valve) which is also used to isolate the air circuit. This PRV valve is disposed upstream of the exchanger and ensures the regulation of the pressure of the hot air source from the engine. Indeed, the direction of the air flow is from the engine to the exchanger and then to devices using compressed air called consumers. The latter provide air conditioning for the cabin as well as compressed de-icing air for the wings and other aircraft structures and systems.

The air circuit also includes a temperature control loop comprising a temperature sensor disposed at the outlet of the exchanger as well as a FAV valve (Fan Air Valve) for regulating the fresh air passing through the air exchanger. The control loop is configured to modulate the fresh air mixed at the exchanger depending on the temperature measured by the probe.

Currently, the detection of hot air leaks around the air/air exchangers and the pressurised air pipes is made via a leak detection loop. This detection loop comprises wires housing the air circuit pipes as well as leak detection sensors disposed between the exchanger and the areas to be protected from the hot air leak flow that may result from this leak. As soon as a leak is detected, the hot air source is automatically isolated by closing the PRV valve, thus preventing any damage to the structure of the aircraft.

This leak detection mode effectively protects the aircraft when the leak becomes too significant. However, it does not allow anticipating the maintenance and can, consequently, lead to aircraft downtime.

The object of the present invention is, consequently, to propose a system for monitoring an air circuit of an aircraft overcoming the aforementioned drawbacks, in particular, by exploiting the measurements on the air circuit to determine its state and predict the leak level in order to anticipate maintenance.

Presentation of the Invention

The invention relates to a method for monitoring the state of a heat exchanger in an air circuit of an aircraft, said heat exchanger being intended to cool the air extracted from a main hot air source of the aircraft, said method including the following steps:

acquisition of the temperature measurements taken by a probe disposed at an outlet of said heat exchanger, said acquisition being carried out when the air circuit is supplied by a secondary hot air source downstream of said heat exchanger and the main hot air source being turned off, selection of a relevant temperature measurement from said temperature measurements, comparing said relevant temperature measurement to an alert threshold, and evaluating a leak level in the heat exchanger depending on said comparison.

This method allows predicting the leak level and anticipating the removal of the exchanger before the leak level becomes significant. This removal can then be carried out during maintenance phases scheduled in advance, thus avoiding unplanned downtime of the aircraft.

Advantageously, the acquisition module is configured to acquire the temperature measurement during a predetermined observation time period, said time period being determined by a statistical analysis on a population of aircrafts including heat exchangers having significant leaks.

This allows optimising the observation period by selecting the shortest possible duration in order to minimise the volume of data to be processed while allowing the discrimination between the different populations of exchangers.

Advantageously, the relevant temperature measurement is selected by a statistical filtering, said statistical filtering being adapted to select the temperature measurement which is most representative of a stabilisation phase comprised in said predetermined observation time period.

According to one embodiment of the invention, said observation time period has a duration between about 3 minutes and 10 minutes. Thus, the observation time is a compromise between processing speed and accuracy.

Advantageously, the processor is configured to standardise said relevant temperature measurement before comparing it to the alert threshold, said standardisation being carried out by removing the dependence of the relevant temperature measurement relative to the external context.

Thus, the standardised temperature measurements can be considered as being observations acquired under identical conditions for each flight of the aircraft.

Advantageously, the external context is identified by a measurement of the outside air temperature and a measurement of the temperature at the outlet of the secondary hot air source. This allows comparing different flights with each other regardless of the outside temperature.

Advantageously, the alert threshold is based on a theoretical value of the air temperature at the outlet of the heat exchanger estimated by a predetermined thermal model, said thermal model being built from a statistical analysis of a series of actual measurements of air temperatures at the outlet of each of a plurality of exchangers of a fleet of aircraft as well as of corresponding temperatures of the outside air and secondary hot air sources.

The alert threshold allows keeping the exchanger as long as possible on the aircraft while guaranteeing the absence of impacts on the performance of the aircraft or of the risks of failure that could block the latter on the ground.

According to one embodiment of the invention, the alert threshold is a value selected between about 100° C. and 150° C.

Advantageously, the processor is configured to estimate the leak level and establish a failure prognosis of the exchanger by an automatic learning based on an ageing model previously built on a series of data from a plurality of flights of the same fleet of aircraft.

According to one feature of the invention, the secondary hot air source downstream of said exchanger is an auxiliary power unit APU. Moreover, the main hot air source upstream of said exchanger is an aircraft engine, the hot air being extracted from said aircraft engine by an engine air bleed system.

According to yet another feature of the invention, the temperature probe is part of a control loop intended to regulate the temperature of a mixture of fresh air and hot air used in order to maintain a constant air temperature at the outlet of the heat exchanger.

Advantageously, the monitoring system includes a display interface to visualise the graphical representations of the measured temperatures, and/or of the leak levels and/or of the failure prognosis.

This provides information on trends, anomalies or breaks relating to the exchangers.

Figure 2A:
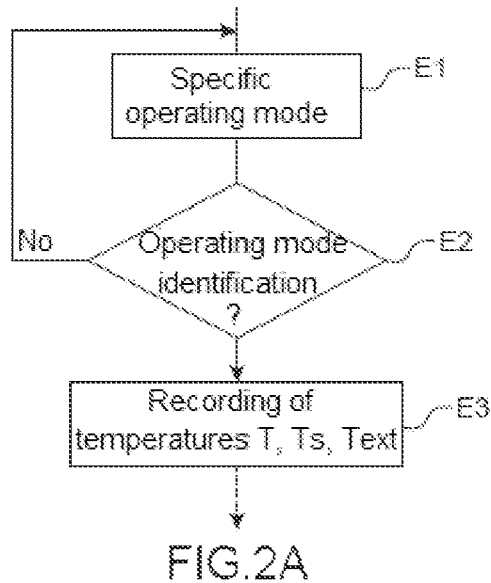
Figure 2B:
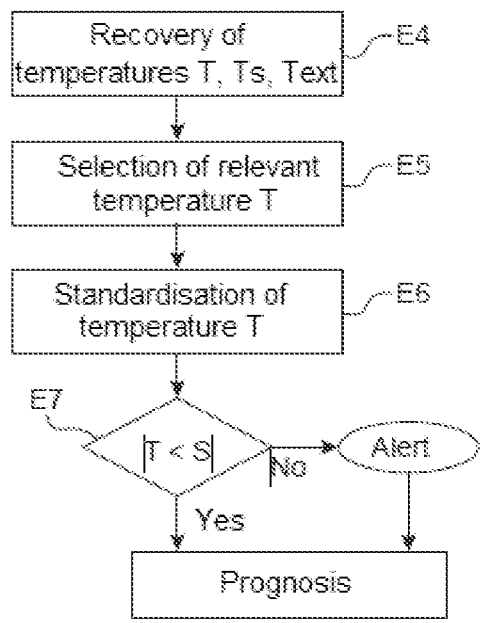
Figure 3:
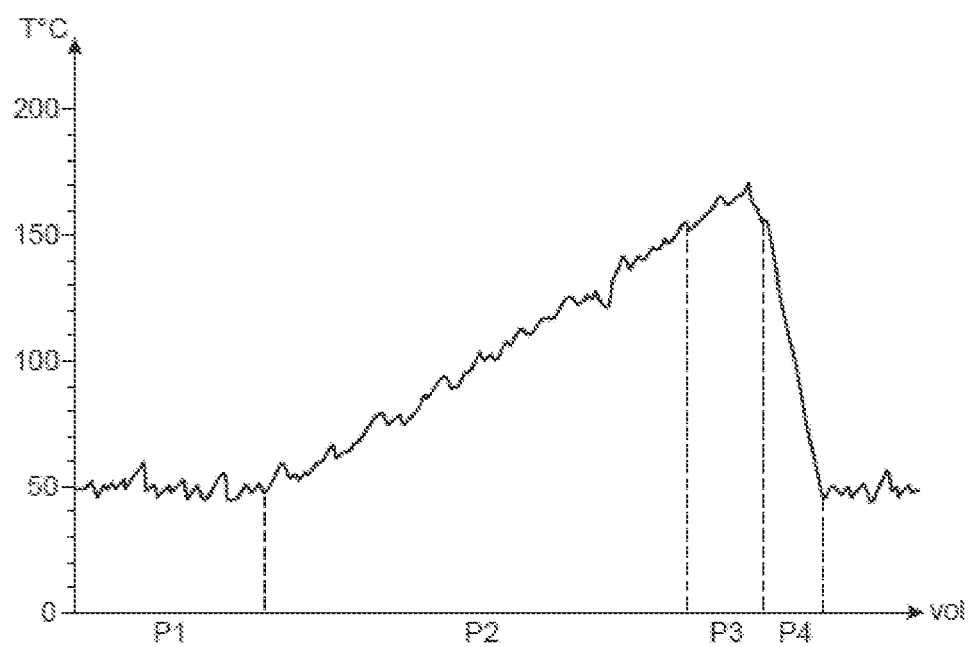

The invention also relates to a system for monitoring the state of a heat exchanger in an air circuit of an aircraft, said heat exchanger being intended to cool the air extracted from a source of a main hot air source of the aircraft, said system including:
- an acquisition module configured to acquire temperature measurements taken by a probe disposed at an outlet of said heat exchanger, said acquisition being carried out when the air circuit is supplied by a secondary hot air source downstream of said heat exchanger and the main hot air source being turned off,
- a processor configured to select a relevant temperature measurement from said temperature measurements and to detect a possible leak in the heat exchanger by comparing the relevant temperature measurement to a predetermined alert threshold Other characteristics and advantages of the invention will become apparent on reading a preferred embodiment of the invention, described with reference to the accompanying figures, from which:

FIG. 1 schematically illustrates a system for monitoring the state of an exchanger in an air circuit of an aircraft, according to one embodiment of the invention;

FIG. 2A and FIG. 2B schematically illustrate a method for monitoring the state of an air circuit in an aircraft, according to a preferred embodiment of the invention;

FIG. 3 is a graph schematically illustrating a curve representing the monitoring of the air temperature measured downstream of the exchanger, according to one embodiment of the invention.

DESCRIPTION OF THE EMBODIMENTS

The present invention relates to air/air cooling heat exchangers integrated into an architecture where the regulation and the control of the temperature of the air flows are carried out by means of a temperature sensor downstream of the hot air flow. The concept underlying the invention is to characterise the leak of an air/air heat exchanger of an aircraft by measuring temperature at the outlet of the exchanger when the air circuit is in a predetermined configuration.

FIG. 1 schematically illustrates a system for monitoring the state of an air circuit and more particularly of a heat exchanger in the air circuit of an aircraft, according to one embodiment of the invention.

The monitoring system 1 includes a computer 3 intended to acquire and process data relating to an air circuit 5 of the aircraft 7. The computer 3 comprises a processor 9, an input interface 10, a memory 12 and a display interface 15. The memory 13 forms a recording medium readable by the processor 9 and on which is/are recorded one or more computer program(s) including instruction codes for executing the method for monitoring the state of the air circuit 5 in the aircraft 7, according to one embodiment of the invention.

The computer 3 of the monitoring system 1 is installed in a ground monitoring and/or maintenance centre. In addition, the monitoring system 1 includes a controller 8 of the air circuit, an acquisition module 11 and a recording module 13 disposed in the aircraft 7.

The air circuit 5 comprises an air/air heat exchanger 17 "PCE" (Pre-Cooler) intended to cool the air extracted from an engine of the aircraft 7 by an engine air bleed system 23. This engine air bleed system 23 is connected to the engine via a pressure regulating valve 25 "PRV" disposed upstream of the heat exchanger 17. The temperature at the engine air bleed system 23 generally varies in a range between 150° C. and 250° C. The PRV pressure regulation valve 25 ensures the pressure regulation as well as the insulation of the hot air source from the engine. Indeed, in normal time, the direction of the air flow goes from the pressure source (i.e. hot air source of the engine) to the consumer systems 27, 28 using compressed air. This hot air source can be turned off or isolated by closing the pressure regulating valve 25 PRV.

Furthermore, the air circuit 5 includes a temperature control loop 29 comprising a temperature probe 31 disposed at the outlet of the heat exchanger 17 as well as an FAV valve for regulating the fresh air 33 passing through the heat exchanger 17. The FAV valve 33 is intended to modulate the fresh air mixed at the heat exchanger 17 depending on the temperature measured by the probe 31. The regulated temperature of the air in the channels of the circuit 5 varies in a range between 150° C. and 250° C. The control loop 29 thus allows maintaining a constant air temperature at the outlet of the heat exchanger 17 from which air is recovered for the consumers 27, 28 (air conditioning 27 for the cabin as well as the de-icing air 28 for the aerofoil, etc.).

In accordance with the invention, the monitoring system 1 combines the temperature measurement downstream of the heat exchanger 17 with specific operating modes. More particularly, the state of the air circuit 5 is monitored by measuring the temperature at the outlet of the exchanger 17 when the air circuit 5 is brought into a specific configuration or operating mode used as an observation phase. This specific operating mode is carried out by isolating the air circuit 5 from the main hot air source (i.e. the engine) and by supplying the air circuit 5 with a secondary hot air source 35 downstream of the exchanger 17. In a plane, the secondary hot air source 35 may be an auxiliary power unit APU generally positioned at the back of the plane 7. The APU is a turbogenerator intended to produce energy on board the plane 7 when the main engines are stopped and is also used to start the latter. Moreover, the air circuit 5 also includes other isolation valves 38 allowing isolating one or the other of the primary and secondary 35 hot air sources.

It will be noted that the specific operating mode of the air circuit 5 allows bypassing the closed regulation loop formed by the main hot air source, the heat exchanger 17 and the probe 31. This bypass allows measuring a temperature which is non-regulated and therefore representative of a possible air leak.

More particularly, when the air circuit 5 is in the specific operating mode, the acquisition module 11 disposed in the aircraft 7 is configured to acquire temperature measurements taken by the probe 31 disposed at the outlet of the exchanger 17. These temperature measurements are recorded in the recording module 13 disposed in the aircraft 7.

Furthermore, the acquisition module 11 is configured to acquire temperature measurements of the secondary hot air which are taken by a probe 36 disposed at the outlet of the secondary hot air source 35 or at the inlet of the air conditioning packs 27 as well as temperature measurements of the outside air which are taken by a probe (not illustrated) placed outside the aircraft. These temperature measurements at the outlet of the secondary hot air source and of the outside air are also recorded in the recording module 13 of the aircraft 7.

All temperature measurements are recovered by the ground monitoring system. More particularly, the data relating to these measurements are acquired by the processor 9 via the input interface 10.

The processor 9 is configured to select a relevant temperature measurement per flight from among all temperature measurements recovered from the recording module 13 of the aircraft. Furthermore, the processor 9 is configured to detect a possible leak in the air circuit 5 and more particularly, in the heat exchanger 17 by comparing the relevant temperature measurement to a predetermined alert threshold. According to the result of this comparison, the processor 9 further determines the leak level in the heat exchanger 17 consequently allowing preventing maintenances on the air circuit 5 and possibly anticipating the removal of the exchanger 17 before the leak level is significant.

FIGS. 2A and 2B schematically illustrate a method for monitoring the condition of an air circuit in an aircraft, according to a preferred embodiment of the invention.

More particularly, FIG. 2A relates to the monitoring steps in the aircraft while FIG. 2B relates to those carried out on the ground.

In step E1, the air circuit 5 is prepared to be brought into a specific operating mode consisting in isolating it from the main hot air source and feeding it by the secondary hot air source 35 downstream of the exchanger 17.

Step E2 is a test to check that the air circuit 5 is well in the specific operating mode of the observation phase. More particularly, the controller 8 of the air circuit in the aircraft is configured to identify the specific operating mode on position criteria of the valves (for example, PRV, FAV) disposed in the circuit 5 upstream and downstream the exchanger 17 and the temperature probe 31. If the test confirms that the PRV valve 25 is properly closed and that the air circuit 5 is supplied by the secondary hot air source 35, then it is proceeded with the next step to start recording the temperature measurements. Otherwise, it is looped back to step E1 to bring the air circuit 5 back into the specific operating mode and recheck this configuration.

In step E3, one is in the observation phase during which the temperatures T read by the probe 31 at the outlet of the exchanger 17 are recorded in the recording module 13 of the aircraft. These temperatures are representative of a possible air leak as well as the state or level of the leak.

It will be noted that when the air circuit 5 is supplied by the secondary hot air source 35 downstream of the exchanger 17 and of the temperature probe 31 (i.e. PRV valve 25 closed), a hot air flow is established between this air source 35 and the consumers 27. In this case, the temperature probe 31 downstream of the exchanger 17 will measure a static temperature corresponding to the temperature of the air resulting from the cooling of the air inside the channels by the heat exchange with the ambient air. When the heat exchanger 17 begins to leak, a hot air flow will consequently be created between this air source and the outside. The temperature of this hot air flow will then be measured by the temperature probe 31 downstream of the exchanger 17, thus giving an indication of the leak level.

More particularly, during each observation phase, the acquisition module 11 is configured to acquire, during a predetermined time period, the temperature measurements taken by the probe 31 disposed at the outlet of the exchanger 17. This time period is advantageously determined by a statistical analysis on a population of aircrafts including exchangers having significant leaks. The duration of this period is optimised to be as short as possible while allowing discriminating the different populations of exchangers. By way of example, the observation time period is a duration comprised between about 3 minutes and 10 minutes. This is a good compromise between speed of processing and accuracy of the result.

Furthermore, still during the observation phase, the temperature $T_s$ at the outlet of the secondary hot air source 35 and the temperature $T_{ext}$ of the outside air taken by the probes respectively disposed at the outlet of the secondary hot air source and outside the aircraft are also recorded in the recording module 13 of the aircraft.

In step E4 (FIG. 2B), the temperature measurements at the outlet of the exchanger 17, at the outlet of the secondary hot air source 35 and of the outside air are recovered on the ground from the recording module 13 of the aircraft via the input interface 10.

In step E5, the processor 9 is configured to select a relevant temperature measurement T per flight from all temperature measurements read at the outlet of the exchanger. The processor 9 implements a statistical filtering to select the temperature measurement which is most representative of a stabilisation phase comprised in the predetermined observation time period. The statistical filtering allows selecting the relevant temperature measurement at a precise moment after the start of the stabilisation phase.

In step E6, the processor 9 is configured to standardise the value of the relevant temperature measured at the output of heat exchanger 17.

Indeed, the temperature measured downstream of the exchanger 17 can be dependent on the external context. This dependence does not allow comparing accurately the leakage measurements carried out according to different external contexts. The standardisation eliminates the dependence of the temperature measurement downstream of the exchanger relative to the external context. It should be noted that the external context may comprise the external temperature, the temperature at the outlet of the secondary hot air source, the external pressure, the altitude, the place of flight (above the sea, the desert, the land, etc.), the weather conditions (rain, snow, frost, etc.), hygrometry, relative aircraft speed, etc. However, the outside temperature and the temperature at the outlet of the secondary hot air source form the most relevant context because their impact on the temperature at the air circuit 5 is the most significant. Thus, the effects of the other conditions can be neglected without compromising the accuracy of the air leakage level assessment thus facilitating the data processing. In other words, it is sufficient to identify the external context by the outside air temperature and the temperature at the outlet of the secondary hot air source.

Standardisation is based in particular on a normalisation of the temperature measurements at the outlet of exchanger 17 and can be carried out by previously building a statistical model from a series of measurements on a population of new exchangers.

For example, the statistical model can be carried out according to a general linear regression model defined on the measurements of the outside air temperature and the temperature at the outlet of the secondary hot air source.

Another more accurate standardisation technique consists in creating in a known manner multivariate normalisation modes depending on the temperatures of the outside air and of the temperature at the outlet of the secondary hot air source from compression algorithms such as PCA (Principal Component Analysis).

Alternatively, the statistical model can be a very simple normalisation model built by calculating the mean and the standard deviation over the series of air temperature measurements at the outlet of each new exchanger. In this case, the standardisation of a current temperature measurement at the outlet of an exchanger read by the temperature probe 31 consists in calculating the difference between the read measurement and the average of the statistical model, and then in dividing the difference by the standard deviation of the model. The standardised measurements of the temperature at the outlet of the exchangers can then be considered as being observations acquired under identical conditions for each flight of the aircraft.

Step E7 is a detection test during which the processor 9 is configured to compare, at the end of the predetermined time period, the relevant standardised temperature measurement at the outlet of the exchanger 17 to a predetermined alert threshold S.

The alert threshold S is based on a theoretical value of the air temperature at the outlet of the exchanger 17 estimated by a predetermined thermal model. This thermal model is built during two prior observation phases from a statistical analysis on series of real measurements of air temperatures at the outlet of each of a plurality of exchangers as well as the corresponding measurements of outside air temperatures and the secondary hot air sources.

The first prior observation phase is performed on a population of aircrafts including exchangers having significant leaks. Indeed, this first prior observation phase is the same as that used in step E3, for determining the predetermined time period.

Moreover, the second prior observation phase is performed on a population of aircrafts including exchangers which do not have any leak. For example on an aircraft fleet coming off the line and/or by dedicated tests on test benches.

Furthermore, a thermal simulation is carried out to establish the heat exchange coefficient of the air circuit 5. It will be noted that the heat exchange rate depends on the length of the channels between the secondary hot air source 35 and the position of the temperature probe 31, the diameter of the channels, their level of insulation if they are equipped therewith and the temperature outside the piping.

These two prior observation phases as well as the heat exchange coefficient of the air circuit allow setting the alert threshold S. By way of example, the alert threshold S is a value selected between about 100° C. and 150° C., for example 120° C.

If the current standardised measurement of the temperature at the outlet of the exchanger 17 is less than the alert threshold S, then it proceeds to step E9 in order to establish prognosis on the state of the exchanger.

Otherwise, that is to say if the current standardised measurement of the temperature is greater than the alert threshold S, then it proceeds to step E8 where an alert (for example, in the form of a message) is transmitted to a maintenance centre before proceeding to the next step E9.

FIG. 3 is a graph schematically illustrating a curve representing the monitoring of the air temperature measured downstream of the heat exchanger, according to one embodiment of the invention.

The ordinate axis of the graph represents the temperature measurements at the outlet of an exchanger on a 10° scale and the abscissa axis represents the dates or periods of the flights during which the measurements were taken.

This graph shows that initially (period P1), the temperature measured downstream of the exchanger 17 is about 50° indicating that the heat exchanger 17 is in very good state. With the ageing of the exchanger 17 as the flights progress, the temperature increases more or less gradually (period P2). It should be noted that the increase in temperature downstream of the exchanger 17 is an indication of a leak in the air circuit 5 and more probably at the exchanger. The graph shows that in the period P3, the temperature slightly exceeds 150° C. followed by a period P4 of abrupt decrease in temperature which decreases by about 100° C. This decrease in the temperature is due to the removal of the defective exchanger 17 and its replacement with a new exchanger.

In step E7, the processor 1 is configured to estimate the leak level and establish a failure prognosis of the heat exchanger 17 by automatic learning based on a previously built ageing model. This allows anticipating the removal of the exchanger. This removal can then take place during scheduled shutdown phases for aircraft maintenance without any operational impact for the airline company.

The ageing model is built from observation data which are available during the design phase of a heat exchanger as well as from a series of data collected during a prior learning phase from a plurality of flights of the same fleet of aircrafts.

The algorithms used for machine learning are based on statistical approaches known to the person skilled in the art. These algorithms allow the processor 9 to learn in an unsupervised manner from the ageing model and new temperature measurements downstream of the exchanger 17.

Furthermore, the ageing model can be refined by a feedback on the results and analyses of leak tests carried out on the exchangers deposited in the maintenance centres.

Advantageously, the graphical representations of the measured temperatures, and/or the levels of leaks and/or the failure prognosis are visualised on the display interface 15.

Moreover, for greater safety, the monitoring system 1 can always include a conventional loop for detecting hot air leaks around the air/air exchangers and pressurised air pipes comprising wires housing the pipes of the air circuit as well as leak detection sensors disposed in the air circuit. As soon as a significant leak is detected, the detection loop automatically isolates the hot air source to prevent any damage to the structure of the aircraft.

The invention claimed is:

1. A method of monitoring the state of a heat exchanger (17) in an air circuit (5) of an aircraft (7), said heat exchanger being configured to cool the air extracted from a main hot air source of the aircraft, said method comprising:
   acquisition of temperature measurements taken by a probe (31) disposed at an outlet of said heat exchanger (17), said acquisition being carried out when the air circuit is supplied by a secondary hot air source (35) downstream of said heat exchanger (17) and the main hot air source being turned off,
   selection of a relevant temperature measurement from said temperature measurements,
   comparing said relevant temperature measurement to an alert threshold, and evaluating a leak level in the heat exchanger depending on said comparison.

2. The method according to claim 1, wherein the acquisition of the temperature measurements is carried out during a predetermined observation time period, said time period being determined by a statistical analysis on a population of aircrafts including heat exchangers having significant leaks.

3. The method according to claim 2, wherein the relevant temperature measurement is selected by a statistical filtering, said statistical filtering being adapted to select from among the temperature measurements which is the most representative of a stabilisation phase comprised in said predetermined observation time period.

4. The method according to claim 2, wherein said observation time period has a duration between about 3 minutes and 10 minutes.

5. The method according to claim 1, further comprising a standardisation of said relevant temperature measurement before comparing it to the alert threshold, said standardisation being carried out by removing the dependence of the relevant temperature measurement relative to an external context.

6. The method according to claim 5, wherein the external context is identified by a measurement of an outside air temperature and a measurement of a temperature at an outlet of the secondary hot air source.

7. The method according to claim 1, wherein the alert threshold is based on a theoretical value of the air temperature at the outlet of the heat exchanger (17) estimated by a predetermined thermal model, said thermal model being built from a statistical analysis of a series of actual measurements of air temperatures at the outlet of each of a plurality of heat exchangers of a fleet of aircraft as well as of corresponding temperatures of the outside air and at the outlets of the secondary hot air sources.

8. The method according to claim 7, wherein the alert threshold is a value selected between about 100° C. and 150° C.

9. The method according to claim 1, further comprising an estimate of the leak level and a failure prognosis of the heat exchanger (17) by an automatic learning based on an ageing model previously built on a series of data from a plurality of flights of a same fleet of aircraft.

10. The method according to claim 1, wherein the secondary hot air source (35) downstream of said heat exchanger (17) is an auxiliary power unit APU.

11. The method according to claim 1, wherein the temperature probe is part of a control loop configured to regulate a temperature of a mixture of fresh air and hot air that maintains a constant air temperature at the outlet of the heat exchanger.

12. The method according to claim 1, further comprising a visualisation of graphical representations of the measured temperatures, and/or of the leak levels and/or of a failure prognosis.

13. A system of monitoring the state of a heat exchanger (17) in an air circuit (5) of an aircraft (7), said heat exchanger being configured to cool the air extracted from a source of a main hot air source of the aircraft, said system comprising:

an acquisition module (11) configured to acquire temperature measurements taken by a probe disposed at an outlet of said heat exchanger, said acquisition being carried out when the air circuit is supplied by a secondary hot air source downstream of said heat exchanger and the main hot air source being turned off, a processor (9) configured to select a relevant temperature measurement from said temperature measurements and to detect a possible leak in the heat exchanger (17) by comparing the relevant temperature measurement to a predetermined alert threshold.

* * * * *